(12) United States Patent
Tsuchiya et al.

(10) Patent No.: US 7,312,891 B2
(45) Date of Patent: Dec. 25, 2007

(54) IMAGE PROCESSING METHOD AND APPARATUS

(75) Inventors: Okinori Tsuchiya, Kanagawa (JP); Shigeyasu Nagoshi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1011 days.

(21) Appl. No.: 10/115,092

(22) Filed: Apr. 4, 2002

(65) Prior Publication Data
US 2002/0154326 A1 Oct. 24, 2002

(30) Foreign Application Priority Data
Apr. 6, 2001 (JP) .............................. 2001-109000
Apr. 3, 2002 (JP) .............................. 2002-101405

(51) Int. Cl.
*H04N 1/60* (2006.01)
*H04N 1/54* (2006.01)
*H04N 1/56* (2006.01)
*G06K 9/00* (2006.01)

(52) U.S. Cl. ........................ 358/1.9; 358/500; 358/501; 358/518; 358/520; 358/525; 358/530; 382/167; 345/601; 345/602; 345/603; 345/604

(58) Field of Classification Search ................. 358/1.9, 358/518, 520, 525, 530, 501; 382/167
See application file for complete search history.

(56) References Cited

U.S. PATENT DOCUMENTS

| | | | | |
|---|---|---|---|---|
| 4,852,485 A | * | 8/1989 | Brunner ..................... 101/211 |
| 4,901,254 A | * | 2/1990 | Dolezalek et al. .......... 356/405 |
| 4,959,711 A | | 9/1990 | Hung et al. .................... 358/80 |
| 5,065,234 A | | 11/1991 | Hung et al. .................... 358/80 |
| 5,299,291 A | * | 3/1994 | Ruetz .......................... 358/1.9 |
| 5,317,426 A | * | 5/1994 | Hoshino ....................... 358/515 |
| 5,596,428 A | * | 1/1997 | Tytgat et al. ................. 358/518 |
| 5,692,071 A | * | 11/1997 | Govaert ....................... 382/167 |
| 5,739,927 A | * | 4/1998 | Balasubramanian et al. ........................... 358/518 |
| 5,786,908 A | * | 7/1998 | Liang .......................... 358/518 |
| 5,982,990 A | * | 11/1999 | Gondek ........................ 358/1.9 |
| 6,232,954 B1 | * | 5/2001 | Rozzi .......................... 345/601 |
| 6,480,299 B1 | * | 11/2002 | Drakopoulos et al. ....... 358/1.9 |

(Continued)

FOREIGN PATENT DOCUMENTS

JP 63-254888 A 10/1988

(Continued)

*Primary Examiner*—Aung S. Moe
*Assistant Examiner*—Beniyam Menberu
(74) *Attorney, Agent, or Firm*—Fitzpatrick, Cella, Harper & Scinto

(57) ABSTRACT

When a color reproduction model of a device is generated, colorimetry of a 9×9×9 grid, for example, is performed utilizing equidistant signal values in the color space of the device. Generally, if the number of grid points is increased, the precision with which the color reproduction model is estimated rises but the time needed for measurement is prolonged because the number of colorimetric measurements is also increased. Accordingly, in a printer system comprising a pre-color-processing table for performing color matching and a post-color-processing table for performing color separation, color patches set non-equidistantly in RGB device color space are printed in accordance with changeover of printer CMYKcm signals in the post-color-processing table and the color reproduction model of the printer is generated using data obtained by measuring the colors of the color patches.

6 Claims, 15 Drawing Sheets

U.S. PATENT DOCUMENTS

| | | |
|---|---|---|
| 6,522,778 B1 * | 2/2003 | Tamagawa .................. 382/167 |
| 6,611,356 B1 * | 8/2003 | Shimizu et al. .............. 358/1.9 |
| 6,902,113 B2 * | 6/2005 | Sali et al. ............. 235/462.04 |
| 7,006,668 B2 | 2/2006 | Iguchi et al. ............... 382/108 |
| 7,009,734 B2 | 3/2006 | Suwa et al. ................. 358/1.9 |
| 7,199,900 B2 * | 4/2007 | Ogatsu et al. .............. 358/1.9 |
| 7,251,058 B2 * | 7/2007 | Pop ........................... 358/1.9 |
| 2002/0122589 A1 * | 9/2002 | Reiman et al. ............. 382/167 |

FOREIGN PATENT DOCUMENTS

| | | |
|---|---|---|
| JP | 02-086388 | 3/1990 |
| JP | 11-187258 | 7/1999 |
| JP | 11-262033 | 9/1999 |
| JP | 2002-281328 * | 9/2002 |

* cited by examiner

FIG. 12

| R AXIS | | | | C AXIS | | | |
|---|---|---|---|---|---|---|---|
| | W | R | K | | W | C | K |
| R | 255 → | 255 ⇒ | 0 | R | 255 ⇒ | 0 → | 0 |
| G | 255 ⇒ | 0 → | 0 | G | 255 → | 255 ⇒ | 0 |
| B | 255 ⇒ | 0 → | 0 | B | 255 → | 255 ⇒ | 0 |
| Y AXIS | | | | B AXIS | | | |
| | W | Y | K | | W | B | K |
| R | 255 → | 255 ⇒ | 0 | R | 255 ⇒ | 0 → | 0 |
| G | 255 ⇒ | 0 → | 0 | G | 255 ⇒ | 0 → | 0 |
| B | 255 → | 255 ⇒ | 0 | B | 255 → | 255 ⇒ | 0 |
| G AXIS | | | | M AXIS | | | |
| | W | G | K | | W | M | K |
| R | 255 ⇒ | 0 → | 0 | R | 255 → | 255 ⇒ | 0 |
| G | 255 → | 255 ⇒ | 0 | G | 255 ⇒ | 0 → | 0 |
| B | 255 ⇒ | 0 → | 0 | B | 255 → | 255 ⇒ | 0 |

FIG. 13

WHITE POINT AREA → ← BLACK POINT AREA

| GRID POINT NO. | | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|---|
| R ⇒ K | C | 0 | 0 | 0 | 0 | 0 | 0 | 10 | 30 | 50 | 72 | 96 | 114 | 132 | 141 | 135 | 126 | 108 |
|  | M | 241 | 241 | 241 | 241 | 241 | 241 | 241 | 241 | 240 | 238 | 235 | 232 | 228 | 220 | 205 | 170 | 104 |
|  | Y | 225 | 225 | 225 | 225 | 225 | 225 | 225 | 225 | 223 | 221 | 218 | 212 | 206 | 195 | 172 | 138 | 84 |
|  | K | 0 | 0 | 0 | 0 | 0 | 0 | 0 | 0 | 10 | 19 | 35 | 52 | 82 | 122 | 178 | 229 | 255 |
|  | c | 0 | 15 | 37 | 60 | 82 | 102 | 114 | 107 | 97 | 86 | 73 | 59 | 47 | 33 | 20 | 9 | 0 |
|  | m | 70 | 15 | 0 | 0 | 0 | 0 | 0 | 0 | 0 | 0 | 0 | 0 | 0 | 0 | 0 | 0 | 0 |
| Y ⇒ K | C | 0 | 0 | 0 | 0 | 0 | 0 | 0 | 0 | 16 | 47 | 86 | 121 | 146 | 157 | 152 | 135 | 108 |
|  | M | 0 | 0 | 0 | 0 | 0 | 0 | 0 | 0 | 13 | 41 | 78 | 111 | 138 | 153 | 148 | 128 | 104 |
|  | Y | 217 | 217 | 217 | 217 | 217 | 217 | 217 | 217 | 217 | 217 | 217 | 217 | 213 | 204 | 184 | 148 | 84 |
|  | K | 0 | 0 | 0 | 0 | 0 | 0 | 0 | 0 | 0 | 0 | 5 | 20 | 53 | 117 | 207 | 255 | |
|  | c | 0 | 13 | 29 | 48 | 70 | 89 | 107 | 123 | 126 | 118 | 100 | 80 | 57 | 36 | 20 | 8 | 0 |
|  | m | 0 | 19 | 37 | 56 | 78 | 100 | 119 | 137 | 138 | 128 | 110 | 90 | 67 | 45 | 28 | 12 | 0 |
| W ⇒ G | C | 0 | 0 | 0 | 0 | 0 | 0 | 0 | 0 | 0 | 0 | 0 | 28 | 83 | 147 | 200 | 233 | |
|  | M | 0 | 0 | 0 | 0 | 0 | 0 | 0 | 0 | 0 | 0 | 0 | 0 | 0 | 0 | 0 | 0 | |
|  | Y | 0 | 7 | 12 | 18 | 26 | 36 | 49 | 61 | 74 | 88 | 103 | 116 | 131 | 148 | 168 | 194 | 225 |
|  | K | 0 | 0 | 0 | 0 | 0 | 0 | 0 | 0 | 0 | 0 | 0 | 0 | 0 | 0 | 0 | 0 | 0 |
|  | c | 0 | 7 | 19 | 36 | 58 | 84 | 110 | 138 | 166 | 194 | 218 | 235 | 234 | 219 | 190 | 150 | 118 |
|  | m | 0 | 0 | 0 | 0 | 0 | 0 | 0 | 0 | 0 | 0 | 0 | 0 | 0 | 0 | 0 | 0 | 0 |
| W ⇒ C | C | 0 | 0 | 0 | 0 | 0 | 0 | 0 | 0 | 0 | 0 | 0 | 22 | 71 | 134 | 197 | 249 | |
|  | M | 0 | 0 | 0 | 0 | 0 | 0 | 0 | 0 | 0 | 0 | 0 | 0 | 0 | 0 | 0 | 0 | 0 |
|  | Y | 0 | 0 | 0 | 0 | 0 | 0 | 0 | 0 | 0 | 0 | 0 | 0 | 0 | 0 | 0 | 0 | 0 |
|  | K | 0 | 0 | 0 | 0 | 0 | 0 | 0 | 0 | 0 | 0 | 0 | 0 | 0 | 0 | 0 | 0 | 0 |
|  | c | 0 | 7 | 18 | 34 | 57 | 82 | 107 | 134 | 161 | 192 | 220 | 243 | 252 | 250 | 234 | 200 | 160 |
|  | m | 0 | 0 | 0 | 0 | 0 | 0 | 0 | 0 | 0 | 0 | 0 | 0 | 0 | 0 | 0 | 0 | 0 |
| W ⇒ B | C | 0 | 0 | 0 | 0 | 0 | 0 | 0 | 0 | 0 | 13 | 44 | 84 | 125 | 160 | 193 | 222 | 246 |
|  | M | 0 | 0 | 0 | 0 | 0 | 0 | 0 | 0 | 0 | 10 | 38 | 81 | 124 | 158 | 196 | 226 | 249 |
|  | Y | 0 | 0 | 0 | 0 | 0 | 0 | 0 | 0 | 0 | 0 | 0 | 0 | 0 | 0 | 0 | 0 | 0 |
|  | K | 0 | 0 | 0 | 0 | 0 | 0 | 0 | 0 | 0 | 0 | 0 | 0 | 0 | 0 | 0 | 0 | 0 |
|  | c | 0 | 7 | 18 | 36 | 59 | 84 | 113 | 140 | 162 | 172 | 173 | 164 | 150 | 125 | 99 | 70 | 30 |
|  | m | 0 | 6 | 17 | 35 | 58 | 83 | 112 | 139 | 161 | 170 | 171 | 162 | 150 | 127 | 99 | 70 | 30 |
| M ⇒ K | C | 0 | 0 | 0 | 0 | 0 | 0 | 0 | 0 | 0 | 20 | 70 | 120 | 160 | 181 | 159 | 108 | |
|  | M | 241 | 241 | 241 | 241 | 241 | 241 | 241 | 241 | 241 | 241 | 241 | 241 | 239 | 234 | 220 | 190 | 104 |
|  | Y | 0 | 4 | 12 | 18 | 24 | 34 | 43 | 51 | 60 | 70 | 81 | 92 | 113 | 140 | 150 | 125 | 84 |
|  | K | 0 | 0 | 0 | 0 | 0 | 0 | 0 | 0 | 0 | 0 | 0 | 17 | 55 | 118 | 209 | 255 | |
|  | c | 0 | 15 | 35 | 56 | 78 | 100 | 120 | 141 | 160 | 178 | 183 | 170 | 127 | 76 | 36 | 15 | 0 |
|  | m | 70 | 15 | 0 | 0 | 0 | 0 | 0 | 0 | 0 | 0 | 0 | 0 | 0 | 0 | 0 | 0 | 0 |

| MEASUREMENT GRID POINTS OF R-SIGNAL VALUE | 1 | 0 | 0 | 0 | 0 | 1 | 0 | 1 | 1 | 1 | 1 | 1 | 1 | 1 | 1 | 1 | 1 |

1 : UNDERGOES MEASUREMENT
0 : DOES NOT UNDERGO MEASUREMENT

REMARKS:
- 0 INK-INTRODUCTION START POINT
- 20 INK CHANGEOVER POINT

FIG. 15

| INDEX i | AXIS | INDEX i | AXIS |
|---|---|---|---|
| 0 | W → R | 1 | R ⇒ K |
| 2 | W → Y | 3 | Y ⇒ K |
| 4 | W ⇒ G | 5 | G → K |
| 6 | W ⇒ C | 7 | C → K |
| 8 | W ⇒ B | 9 | B → K |
| 10 | W → M | 11 | M ⇒ K |

AXIS TO UNDERGO PROCESSING IS INDICATED BY ARROW ⇒

IMAGE PROCESSING METHOD AND APPARATUS

FIELD OF THE INVENTION

This invention relates to an image processing method and apparatus, e.g., image processing for generating a color reproduction model of a device using a plurality of colorimetric values.

BACKGROUND OF THE INVENTION

Color matching is performed between an input device such as a scanner or digital camera and an output device such as a monitor or printer by using a profile, which is data representing the characteristics of color conversion between color input/output devices. For example, the profile for a printer output is created by the method described below.

First, on the basis of RGB values (CMYK values), which are color signals in color space dependent upon the printer, a prescribed number of color patches of these colors are output by the printer and the color patches are measured by colorimetry to obtain XYZ values (or Lab values), which are color signals in a color space that is not dependent upon the printer. As a result, the relationship between the RGB values and XYZ values is found.

Next, by utilizing the obtained relationship from the RGB values to XYZ values, masking coefficients are decided by an iterative method or the like or a mapping from the RGB values to the XYZ values is obtained, whereby a relationship from the XYZ values (or Lab values) to the RGB values (or CMYK values), which is the relationship in the opposite direction, is obtained as color correction data.

In a case where a relationship from the RGB values (or CMYK values) to the XYZ values (or Lab values) is obtained in the above-described profile creation processing, the greater the number of samples such as color patches, the higher the precision. However, printing out samples of all colors in RGB color space is unrealistic. Accordingly, the following methods are available to obtain the relationship from RGB values (or CMYK values) to XYZ values (Lab values):

(1) A method in which basic colors such as RGB are measured by colorimetry and the XYZ values are found by the Neugebauer equations, which use these colors as tristimulus values.

(2) A method in which color patches distanced apart equally in color space are measured by colorimetry to find the relationship between RGB values and XYZ values, and a similar relationship is found by estimating colorimetric values through linear interpolation with regard to colors intermediate the color patches.

(3) A method, which is similar to the method (2) above, in which curvilinear interpolation is performed to raise precision with regard to the relationship obtained by colorimetric measurement of the color patches (for example, see the specification of Japanese Patent Application Laid-Open No. 63-254888).

(4) A method, which is similar to the method (3) above, in which colors are predicted by setting up a non-linear masking model in order to raise precision with regard to the relationship obtained by colorimetric measurement of the color patches.

Method (1) estimates XYZ values with regard to any CYM values by the Neugebauer equations, which employ XYZ values as tristimulus values with respect to eight points of colors cyan (C), magenta (M), yellow (Y), red (R), green (G), blue (B), black (B) and white (W), which is the color of the printing medium, and each area ratio of the basic colors such as CMY. This method is equivalent to a three-dimensional interpolation in which the eight points of the basic colors serve as apices. However, since the actual color conversion characteristics are more complex, this method generally is inferior in terms of precision.

Methods (2) and (3) both utilize color patches that are equidistant in color space. Coordinates of equidistant grid points (e.g., 9×9×9) in RGB space produced by a printer signal are selected as the values of these color patches. In general, the precision of color estimation is improved if the number of grid points is increased. However, the time needed for measurement is prolonged because the number of colorimetric measurements is also increased.

For example, consider obtaining CMYKcm values (a color profile) corresponding to the RGB values of a certain monitor, where c represents light cyan and m represents light magenta. A monitor RGB value for obtaining the CMYKcm value is indicated at P10 in FIG. 8. In a gamut mapping for mapping monitor RGB values to colors (L*a*b* values) in the printer gamut, it is assumed that mapping has been carried out so as to maintain saturation before and after mapping. In such case, the position on the printer gamut corresponding to P10 is P20, which is situated on L31 of the actual printer gamut. Because the printer gamut is formed by tetrahedral interpolation using samplings, as indicated by the broken line in FIG. 8, the position corresponding to P20 is shifted onto L30. In other words, in accordance with the method of measuring color patches that are equidistant in color space, the place where printing should be performed by the CMYKcm combination (the left side in FIG. 8) on L31 shifts to an ink changeover portion (the left side in FIG. 8) on L30. The result is a decline in tonality. The details of FIG. 8 will be set forth in the description of an embodiment below.

Further, method (2) is such that when colorimetric values between color patches are estimated, XYZ values (or Lab values) obtained by colorimetry are stored at the corresponding grid points of a look-up table (referred to as a "LUT" below) and XYZ values are estimated with respect to RGB values or CMYK values intermediate the color patches by a linear interpolation such as eight-point interpolation or four-point interpolation using eight points or four points that are nearby. Such linear interpolation generally exhibits a comparatively large error with respect to the actual characteristics because the results of interpolation lack smoothness. Accordingly, if the results of estimation by method (2) are stored in an AtoB0 tag of an ICC (International Color Consortium) profile, a print result will contain a large quantity of noise when it is previewed on a monitor. Further, if an input value such as an RGB value indicates coordinates identical with those of a grid point, the output value becomes a colorimetric value per se and the colorimetric error prevailing at the time of colorimetry is reflected in the output directly.

As opposed to method (2), method (3) uses a LUT in a manner similar to that of method (2) and performs a curvilinear interpolation using three or more nearby points with respect to RGB values or CMYK values. However, since this method focuses on points in the vicinity of the input value, the colorimetric error at the time of colorimetry becomes relatively large with respect to each of these nearby points and the colorimetric error cannot be mitigated satisfactorily.

Method (4) sets up a non-linear masking model and therefore can predict colors with a comparatively high precision. However, this level of prediction precision is unsatisfactory and results in inadequate tonality in a system, which is employed in an inkjet printer for, e.g., the six colors CMYKcm, in which the way signal values corresponding to the C, M, Y, K, c and m inks are changed over is quite different.

SUMMARY OF THE INVENTION

Accordingly, an object of the present invention is to solve the foregoing problems individually or collectively by generating a color reproduction model of a device in a highly precise manner using fewer colorimetric values.

According to the present invention, the foregoing object is attained by providing an image processing method for generating a color reproduction model of a device using a plurality of colorimetric values, comprising deciding intervals of signal values to include a darkest point, a brightest point, a maximum saturation point, and a changeover area of color materials, wherein the signal values are disposed substantially equidistantly in a color signal space of the device and at least one signal value disposed non-equidistantly and measuring the plurality of colorimetric values from color patches produced based upon signal values decided in the deciding step.

Further, according to the present invention, the foregoing object is attained by providing a computer-readable medium comprising computer program code for an image processing method for generating a color reproduction model of a device using a plurality of colorimetric values, comprising process procedure code for measuring the plurality of colorimetric values from color patches produced based upon signal values disposed substantially equidistantly in color signal space of the device and at least one signal value disposed non-equidistantly.

Further, according to the present invention, the foregoing object is attained by providing an image processing apparatus for generating a color reproduction model of a device using a plurality of colorimetric values, comprising: means for deciding intervals of signal values to include a darkest point, a brightest point, a maximum saturation point, and a changeover area of color materials, wherein the signal values are disposed substantially equidistantly in a color signal space of the device and at least one signal value disposed non-equidistantly, a generator for generating color patches based upon signal values so decided, and a measuring unit for measuring the plurality of colorimetric values from the color patches generated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a diagram useful in describing axes for detecting candidates to undergo measurement;

FIG. 13 is a diagram useful in describing a method of selecting grid points, when grid points to undergo measurement are selected, on grid points of an R signal;

FIG. 15 is a diagram useful in describing axes, which are to undergo processing, indicated by an index i.

DESCRIPTION OF THE PREFERRED EMBODIMENT

Image processing according to the present invention will be described in detail with reference to the drawings.

[Structure]

Figure 1:
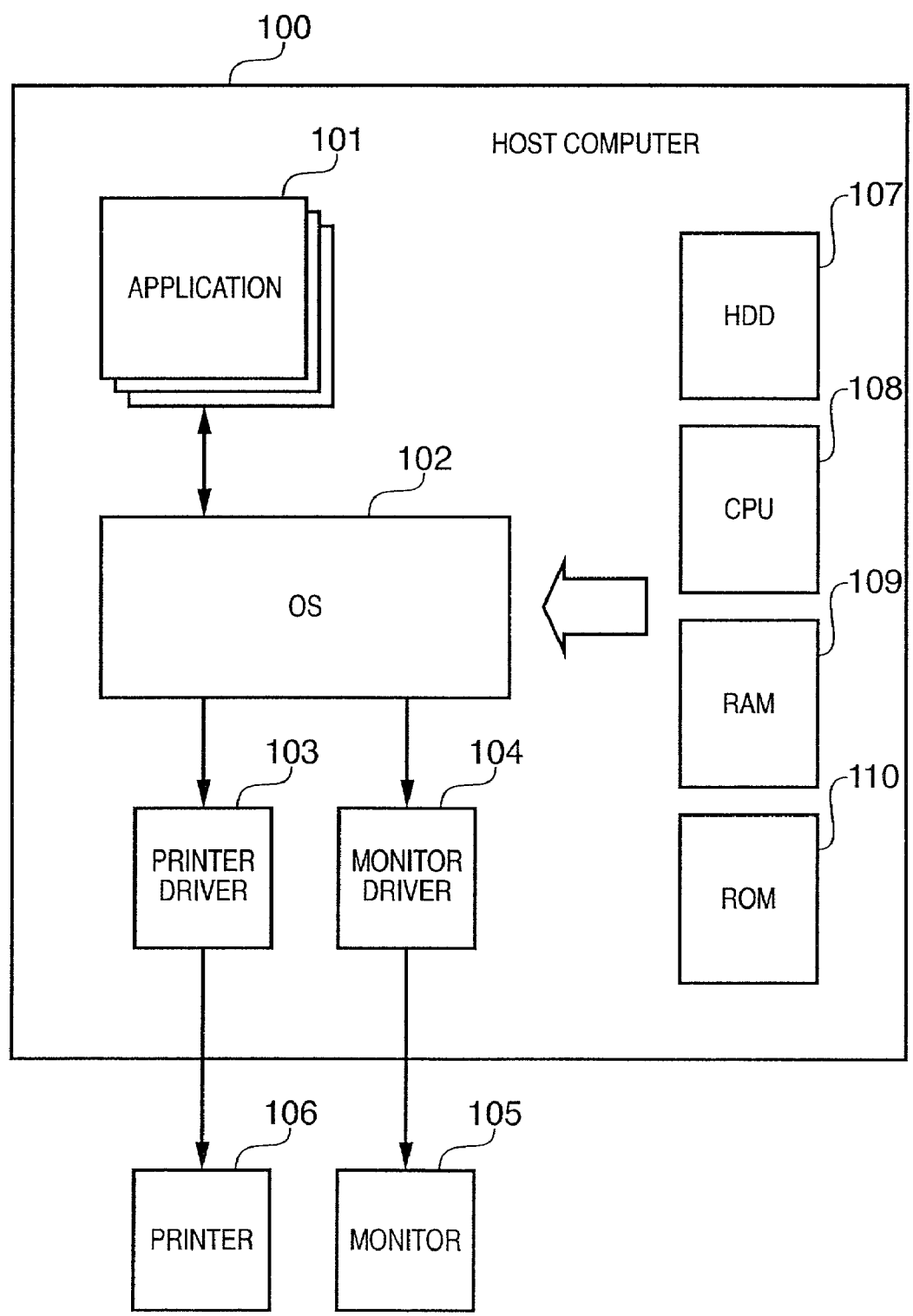
FIG. 1 is a block diagram illustrating the structure of an image processing apparatus according to an embodiment of the present invention.

FIG. 1 is a block diagram illustrating the structure of an image processing apparatus according to this embodiment.

As shown in FIG. 1, a host computer 100 has application software 101 such as word processor, spreadsheet and Internet browser software, an operating system (OS) 102, a printer driver 103 for creating print data, which represents an output image, by processing a group of various print instructions (image print instruction, text print instruction and graphics print instruction) sent from the application software 101 to the operating system 102, and a monitor driver 104 for creating image data displayed on a monitor 105.

The host computer 100 includes a CPU 108, a hard disk drive (HDD) 107, a RAM 109 and a ROM 110 as hardware for executing the above software.

The arrangement shown in FIG. 1 is considered to be a personal computer in which the application software 101 having a printing function has been loaded, with Windows (Microsoft's registered trademark) serving as the operating system 102. Furthermore, an inkjet printer, for example, can be used as a printer 106 and a CRT or LCD can be used as the monitor 105.

On the basis of an image displayed on the monitor 105, the application software 101 of host computer 100 creates output image data, which is to be printed, using text data classified as text such as characters, graphics data classified as graphics such as figures, and image data classified as photographic images and the like. In a case where an output image is printed, a print request is issued from the application software 101 to the operating system 102. Thus the operating system 102 is sent a group of print instructions in which text data is formed as a text print instruction, graphics data as a graphics print instruction and image data as an image print instruction.

Upon receiving the print request, the operating system 102 delivers the group of print instructions to the printer driver 103, which corresponds to the printer that is to execute printing. The printer driver 103 processes the print request and group of print instructions that enter from the operating system 102, whereby print data that can be printed by the printer 106 is created. The print data is transferred to the printer 106.

If the printer 106 is a raster printer, the printer executes image correction processing sequentially with respect to the group of print instructions and rasterizes the image sequentially in an RGB 24-bit page memory. After all of the print instructions have been rasterized, the printer driver 103 converts the RGB data, which has been stored in the page memory, to a data format, e.g., CMYK data, that can be printed by the printer 106, and transfers the CMYK data to the printer 106.

Figure 2:
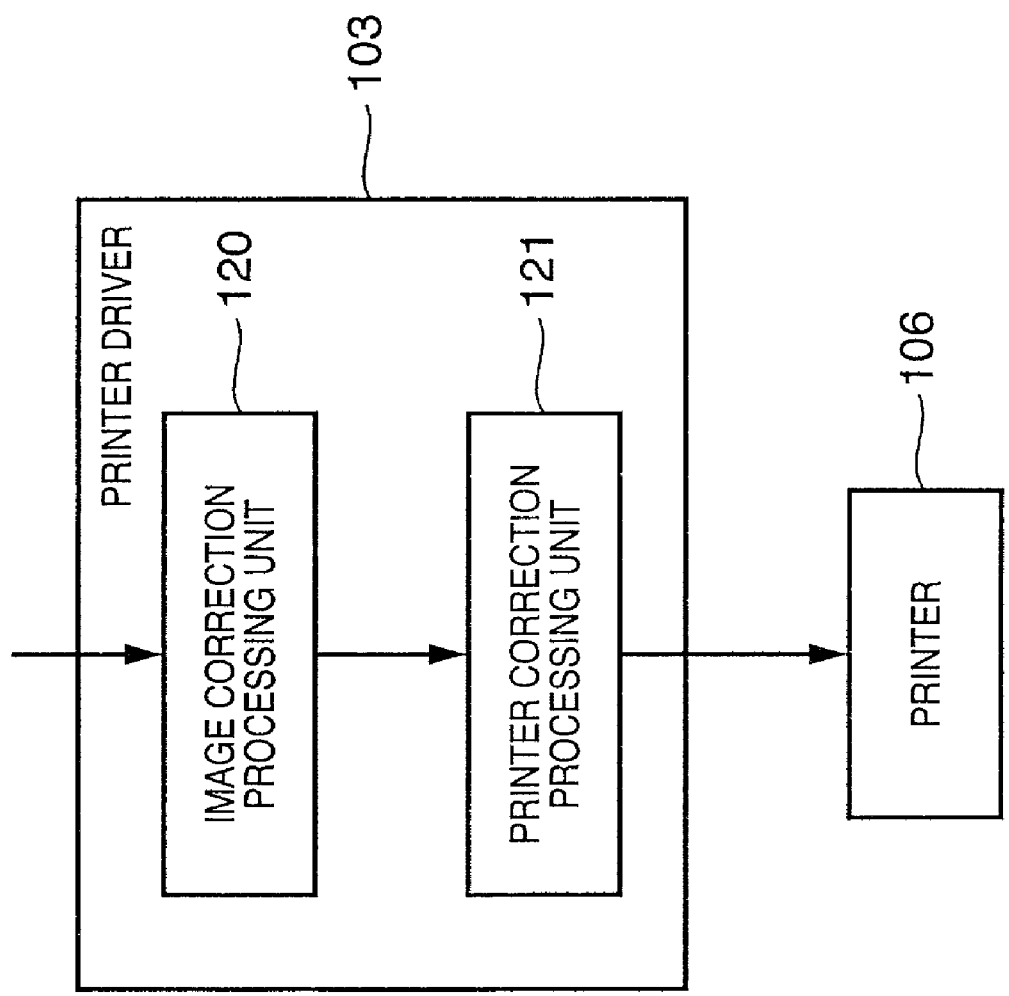
FIG. 2 is a diagram useful in describing processing executed by a printer driver.

FIG. 2 is a diagram useful in describing the processing executed by the printer driver 103.

In FIG. 2, an image correction processing unit 120 applies image correction processing to color information included in the group of print instructions that enter from the operating system 102. More specifically, this is processing for converting RGB color information to luminance and color difference signals, applying exposure correction processing to the luminance signal and then converting the corrected luminance signal and the color difference signal back to RGB color information.

A printer correction processing unit 121 refers to the RGB color information that has undergone image correction processing, rasterizes the image based upon the print instructions and generates a raster image in the page memory. The printer correction processing unit 121 subjects the raster image to processing such as color reproduction mapping (gamut mapping), color separation into CMYK and tone correction, and generates CMYK data, which depends upon the color reproducibility of the printer 106, pixel by pixel.

Figure 3:
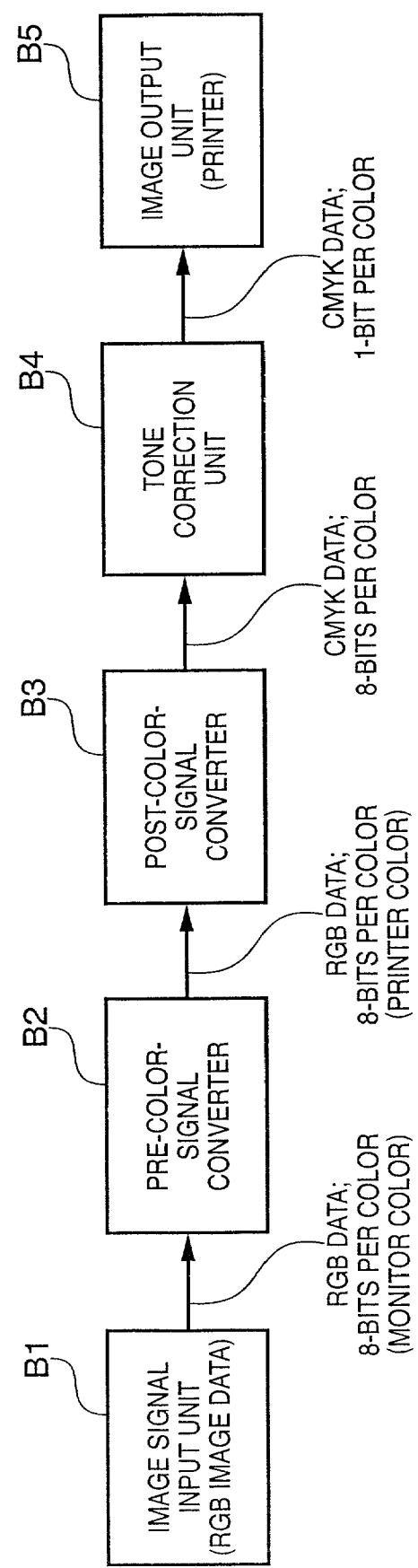
FIG. 3 is a diagram useful in describing the details of processing executed by a printer correction processing unit.

FIG. 3 is a diagram useful in describing the details of the printer correction processing unit 121.

As shown in FIG. 3, input image data B1 is subjected to color matching processing in a pre-color-signal converter B2, color separation processing, which takes the characteristics of the ink-jet printer into account, in a post-color-signal converter B3, and tone correction and half-tone processing in a tone correction unit B4. The processed data is transferred to a printer B5 as CMYKcm dot information corresponding to each of the inks, whereby the image is formed.

[Derivation of Pre-Color-Processing Table]

Figure 4:
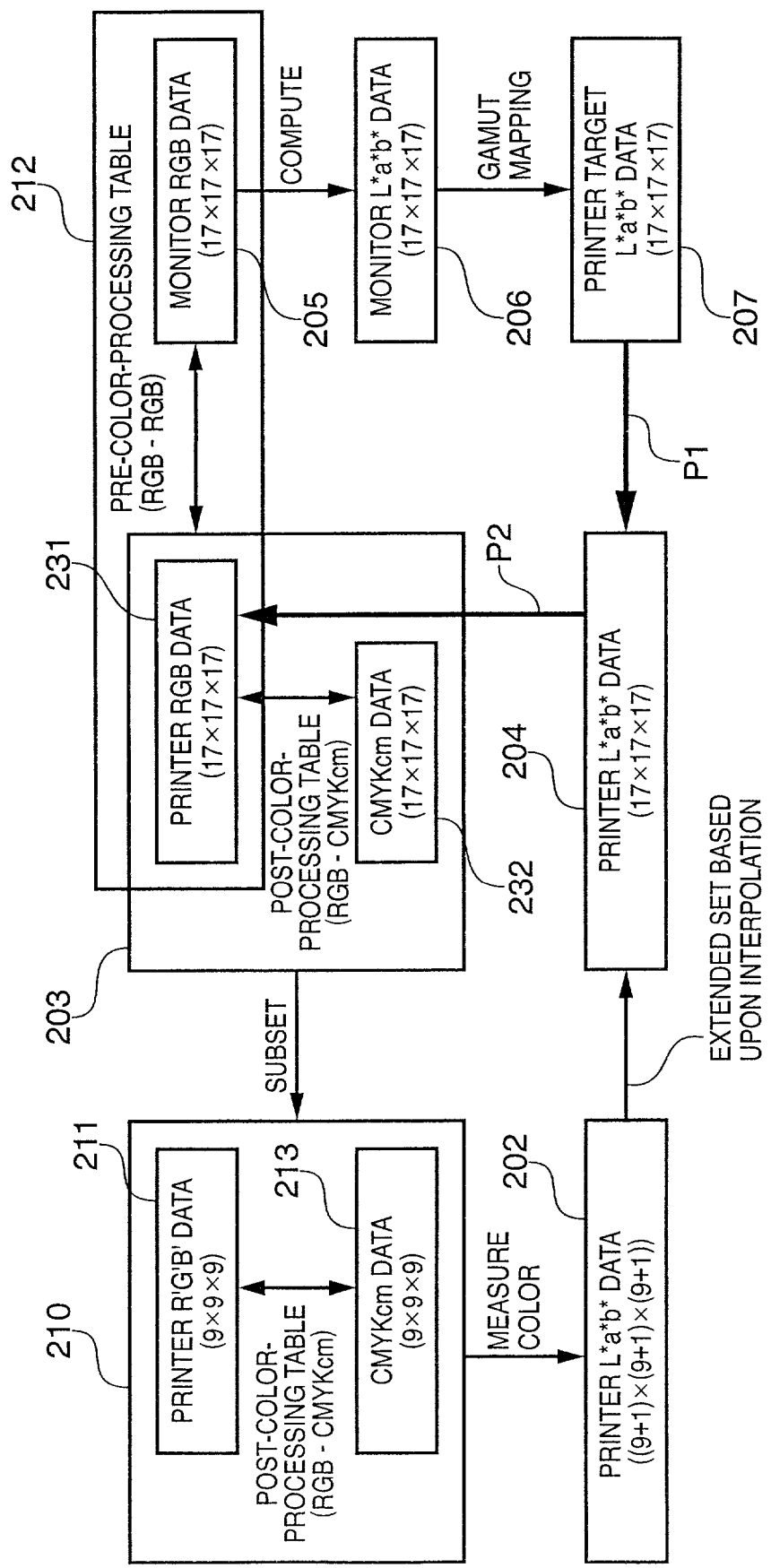
FIG. 4 is a diagram useful in describing a method of calculating a pre-color-processing table used in a pre-color-signal converter.

Next, reference will be had to FIG. 4 to described the details of a method of deriving a pre-color-processing table 212 used in the pre-color-signal converter B2.

The pre-color-processing table 212 is a three-dimensional LUT for performing color matching between an RGB monitor and an RGB printer having different color reproduction characteristics. The pre-color-processing table 212 is derived by converting monitor RGB data 205 and printer RGB data 231 to data of a color space that is independent of the device (Device-Independent Space, or DIS), and correlating the monitor RGB data 205 and printer RGB data 231.

Conversion from Monitor RGB to DIS

The monitor RGB data 205 is converted to data of XYZ color space, which is the DIS, by an operation using a conversion formula based upon a standard such as sRGB. Here chromaticity in CIE L*a*b* color space is found taking the human sense of color into consideration.

Conversion from Printer RGB to DIS

In this embodiment, the printer 106 is assumed to be an ink-jet printer that uses inks of a total of six colors, namely dark inks of colors CMYK and light ink of colors cm. The ink-jet printer is required to perform color separation that takes into account the granularity of printed dots and the total amount of an ink droplet that can be received by the printing medium per unit time and unit area. A post-color-processing table 203 is set beforehand for subjecting the input RGB data to color separation and outputting a suitable combination of the CMYKcm inks after these requirements are taken into consideration.

If color processing in the printer is manipulated via the post-color-processing table 203, the printer can be handled simply as an RGB device for processing RGB data without being influenced by the structure of the printer, e.g., whether the printer prints using the four colors CMYK or the six colors CMYKcm.

In an ink-jet printer, complex and multifarious facts have a bearing upon color development. For example, color development varies depending upon the mixing of ink colors and depending upon the manner in which the ink is absorbed into the printing medium. As a consequence, it is difficult to predict the color development characteristic by analysis. In order to express the color reproducibility of an ink-jet printer while avoiding a difficulty in predicting color development, consider obtaining L*a*b* data corresponding to specific printer RGB and expressing the corresponding relationship between printer RGB and L*a*b* in the form of a three-dimensional table by the following method: Color patches are printed in possible combinations of printer RGB data and at suitable sampling intervals, the color patches are measured by a calorimeter such as the Spectrolino manufactured by Gretag, and grid-point data (L*a*b* values) in printer color reproduction space is obtained. If L*a*b* values of the grid points are obtained, L*a*b* values (coordinates in DIS) corresponding to any printer RGB values can be found from the grid-point L*a*b* values using well-known interpolation such as tetrahedral interpolation.

In this embodiment, use is made of the post-color-processing table 203, in which the sampling interval of the post-RGB signal values is 16 and which has 17.times.17.times.17 (4913) grid points of post-RGB signal values 0, 16, 32, 48, 64, 80, 96, 112, 128, 144, 160, 176, 192, 208, 224, 240 and 255.

As for the L*a*b* data at the grid points of the post-color-processing table 203, the grid points are downsampled (one point is added on at a grid-point interval corresponding to a sampling interval of "32") and (9+1)×(9+1)×(9+1) grid points (1000 points) corresponding to the grid points of post-RGB signal values 0, 16, 32, 64, 96, 128, 160, 192, 224 and 255, i.e., a subset 210 of the post-color-processing table 203 actually used, are measured by colorimetry to obtain 1000 items of L*a*b* data 202. (The printer R'G'B' data 211 of subset 210 is converted by using the post-color-processing table, into CMYKcm data 213 of subset 210, to print 9×9×9 color patches for colorimetry, as shown in FIG. 4. The printer L*a*b* data 202 shown in FIG. 4 is obtained by colorimetry of these 9×9×9 color patches.) L*a*b* data 204, which is grid-point data of the post-color-processing table 203, namely an extended set of the subset L*a*b* data 202, is obtained by well-known interpolation such as tetrahedral interpolation.

Gamut Mapping

Figure 5:
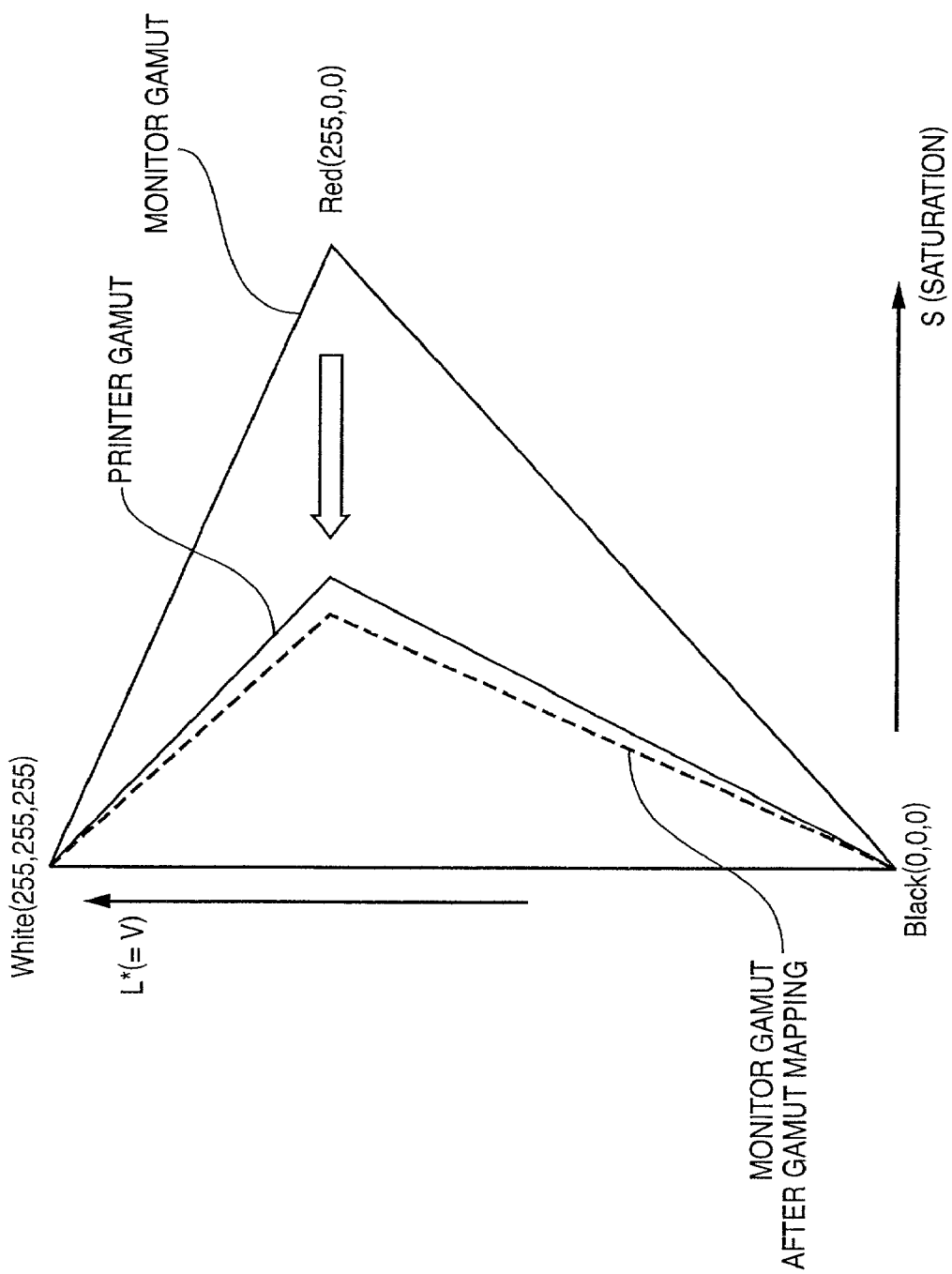
FIG. 5 is a diagram useful in describing a color mapping for converting L*a*b* data of a monitor to L*a*b* data of a printer target.

Next, reference will be had to FIG. 5 to describe gamut mapping for converting L*a*b* data 206 of the monitor to L*a*b* data 207 of the printer target.

In L*a*b* color space shown in FIG. 5, the gamut (color reproduction region) of the monitor RGB is broader in terms of lightness L* and saturation S than the gamut of the printer RGB. For this reason, all RGB combinations displayed on the monitor cannot be output as suitable chromaticity by the printer merely by correlating the monitor RGB and printer RGB in L*a*b* color space. Accordingly, though the L*a*b* values cannot be made to coincide, gamut mapping is performed in such a manner that an output is produced by the printer with a color tone that resembles that of a monitor display.

In this embodiment, the method of gamut mapping involves changing the gamut of the monitor L*a*b* data 205 in L*a*b* color space, generating L*a*b* data 207 of the printer target, and lowering saturation $S=\sqrt{(a^{*2}+b^{*2})}$, while lightness L* is maintained, as shown for example in FIG. 5, in such a manner that the L*a*b* data 207 of the printer target will fall within the gamut of printer RGB.

Generation of Pre-Color-Processing Table

By virtue of the above-mentioned mapping, the L*a*b* data 207 of the printer target is adjusted so as to fall within the RGB gamut of the printer. That is, by following the processing of P1→P2 shown in FIG. 4, the L*a*b* data 207 of the printer target can be correlated with printer RGB data 231.

Here a L*a*b*→RGB conversion must be made with regard to each point (L*a*b* value) of the L*a*b* data 207 of the printer target converted so as to fall within the RGB gamut of the printer. Here RGB is found by tetrahedral interpolation using the L*a*b* data 207 of the printer target that is to undergo the L*a*b*→RGB conversion and the neighboring points constituting the RGB gamut of the printer, and extrapolation is performed with regard to points that do not fall within the RGB gamut of the printer. A conversion method that constructs a printer model using reverse tetrahedral interpolation, a neural network or a multiple regression formula can also be used as the L*a*b*→RGB conversion method.

By following the processing 205→206→207, the monitor RGB data 205 is correlated with the L*a*b* data 207 of the printer target. Accordingly, by following the above-mentioned two processes in order, a conversion is made successively in the form 205→206→207→P1→204→P2→231, whereby the pre-color-processing table 212 can eventually be obtained.

If processing is executed using the pre-color-processing table thus obtained, the monitor RGB data 205 will be mapped to the printer RGB data 231. Further, by using the post-color-processing table 203, mapping to CMYKcm (232), namely the ink colors of the printer, is achieved. In other words, the monitor RGB data 205 can be mapped to the CMYKcm data (232) via the printer RGB data 231.

The correspondence between the RGB, CMYK signal values and the L*a*b* values will be described in further detail with reference to FIG. 6.

As described in connection with gamut mapping set forth above, in general the color reproduction region of a monitor differs from that of a printer. In order to simplify the description, however, FIG. 6 (and FIG. 8) are drawn in such a manner that the lightness range corresponding to that from a white point to a black point and the maximum-saturation point will readily correspond between those for a monitor and those for a printer.

Further, the CMYKcm values indicating combinations of inks for realizing colors of any L*a*b* values within the printer gamut are obtained via the printer RGB values. However, in order to simplify the description, FIG. 6 (and FIG. 8) are drawn in a state of direct mapping, without showing a graph of printer RGB values, in such a manner that the L*a*b* values and CMYKcm values are readily mapped.

Figure 6:
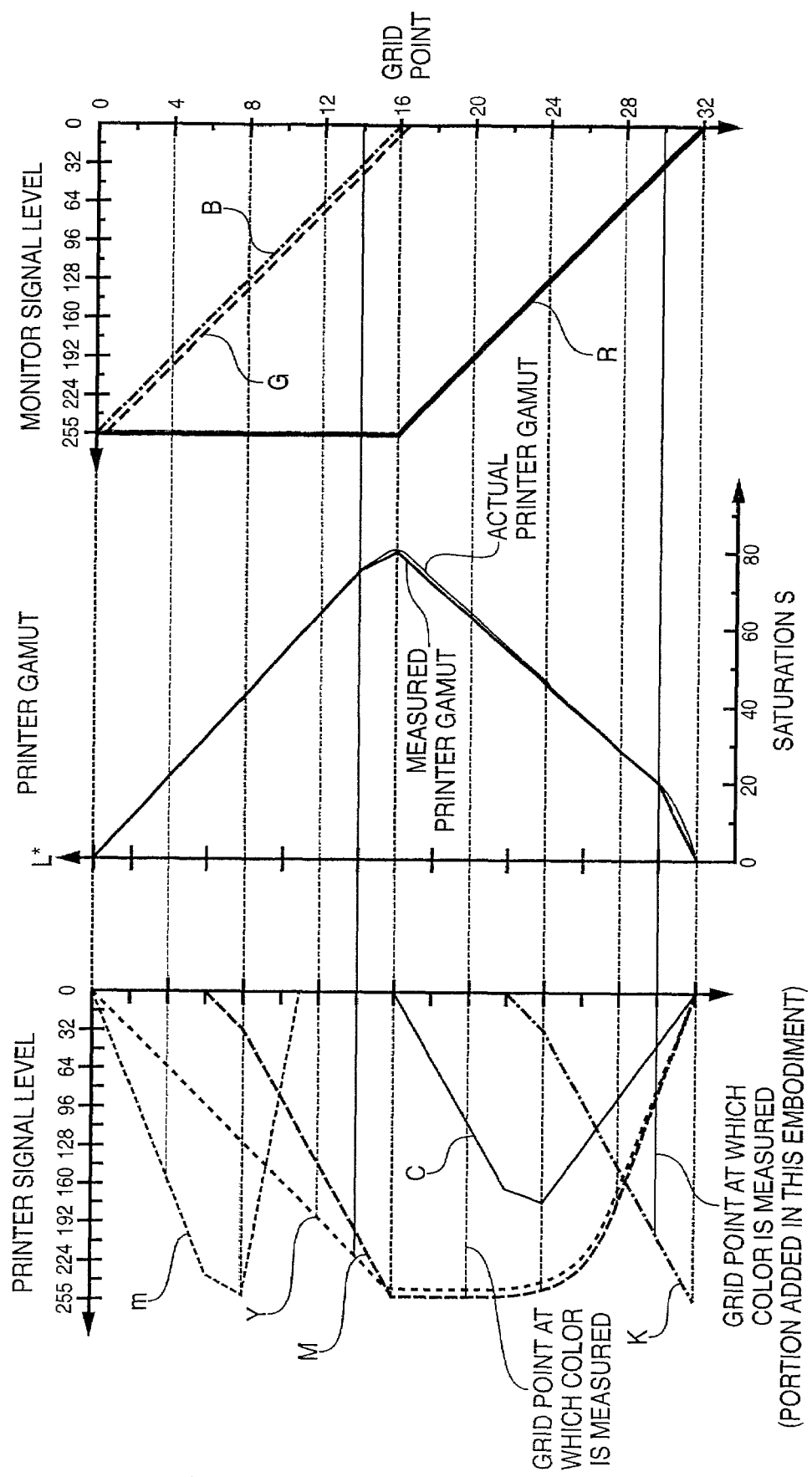
FIG. 6 is a diagram illustrating the correspondence between RGB, CMYK signal values and L*a*b* values.

FIG. 6 is a graph schematically illustrating a change in chromaticity along an axis traversed in the order White→Red→Black in a color solid corresponding to the color gamuts of a printer and monitor. This illustrates, from the left side, changeover of the CMYKcm signals in the RGB printer, the printer gamut and a change regard the monitor RGB signal values.

For example, with regard to the changeover of the printer CMYKcm signals indicated on the left side in FIG. 6, Red in a bright region is expressed by m, Y (the upper part of the center diagram), and maximum saturation (the central portion in the drawing) is attained at M, Y (the central part of the center diagram). Successive darkening occurs by adding the complementary color c to M, Y, and a transition is finally made to K. By reducing the color components of M, Y, achromatic Bk (the lower part of the center diagram) is attained.

Similarly, with regard to the changeover of the monitor RGB signals indicated on the right side in FIG. 6, all of the RGB signals become brightest (White) at maximum. By reducing the G, B signals in stages, lightness declines and saturation due to the R signal increases in relative terms. Furthermore, saturation becomes maximum at the point where the G, B signals are zero and the R signal is 255, after which the R signal itself weakens, as a result of which both lightness and saturation decline.

In the above-described section "Conversion from printer RGB to DIS", RGB combinations sampled at a step width of 32 are printed and the L*a*b* data is obtained when the printer gamut is constructed. The sampling points at which colorimetry is to be performed on the printer L*a*b* data 202 shown in FIG. 4 are indicated by the parallel broken and solid lines in FIG. 6. The broken line indicates sampling points used not only in this embodiment but also in the prior art, and the solid line indicates the sampling points added on in this embodiment.

In the post-color-processing table 203 of 17×17×17 grid points, originally at least data corresponding to 17 is to be measured by colorimetry in a system in which ink changeover is achieved. In the prior art, sampling points corresponding to a 9×9×9 grid (namely every other point in the 17×17×17 grid) undergo colorimetry by sampling (see the left side and the center of FIG. 6), as indicated by the broken line in FIG. 6. By contrast, in this embodiment, a sampling point of signal value [16] is added on (see the solid lines in FIG. 7 and FIG. 6) as [1] of the (9+1)×(9+1)×(9+1) grid with regard to each of R, G, B, and therefore a sampling point corresponding to the solid line shown in FIG. 6 is added on and color is measured.

In the prior art, the coarsely measured data is subjected to tetrahedral interpolation every other point in the 17×17×17 grid and the interpolated data is used in the printer gamut, whereby the printer gamut that originally is to change smoothly in the manner of the "ACTUAL PRINTER GAMUT" shown in FIG. 6 is represented as a polyhedral shape in the manner of "MEASURED PRINTER GAMUT". By contrast, in this embodiment, colorimetry is added on with regard to sampling points of RGB signal value [16] and the spacing of the grid points is made uneven, thereby making it possible to obtain a "MEASURED PRINTER GAMUT" that approximates the "ACTUAL PRINTER GAMUT".

This will be described in greater detail with reference to FIG. 8.

Figure 7:
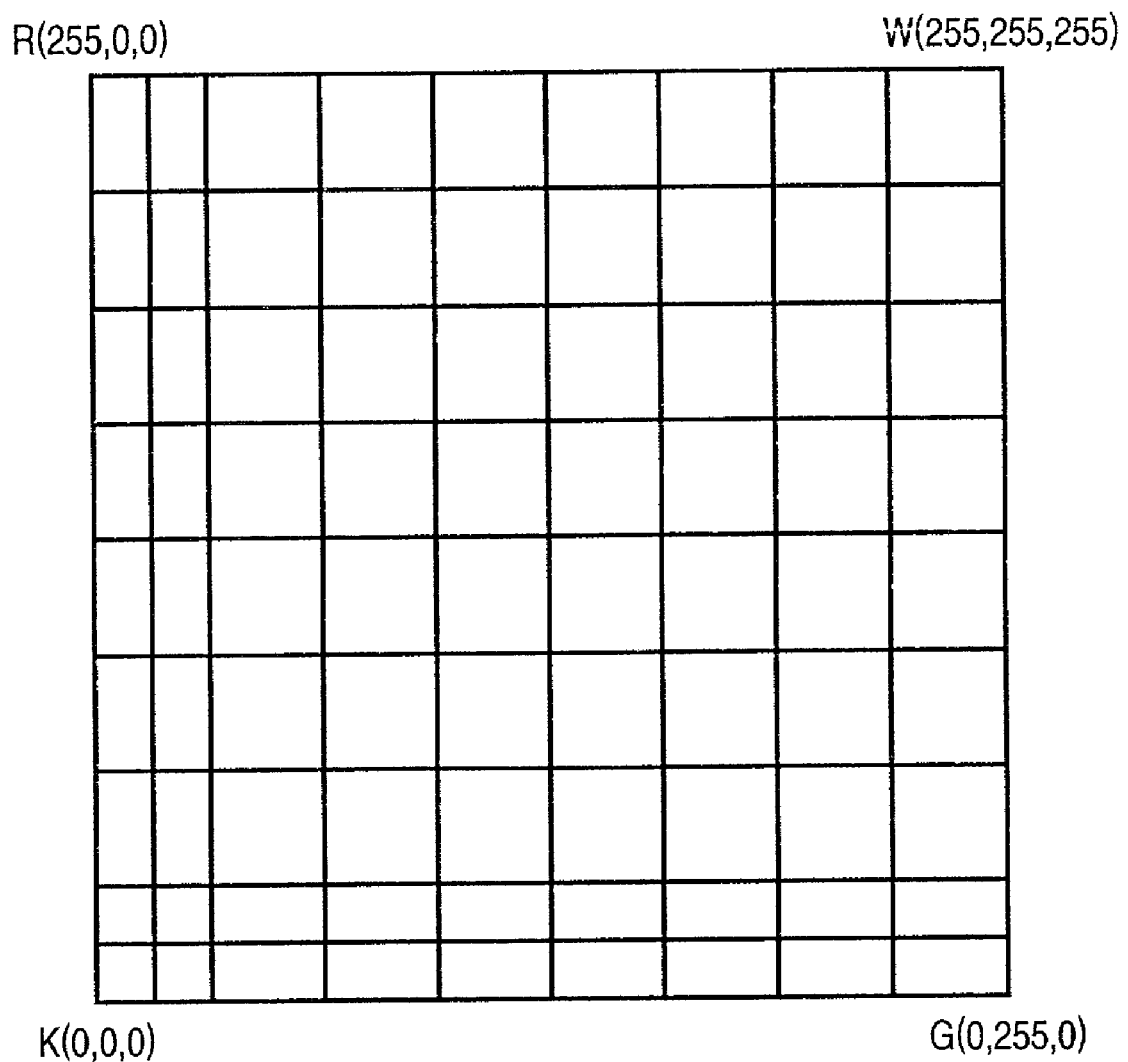
FIG. 7 is a diagram useful in describing the adding on of sampling points.
Figure 8:
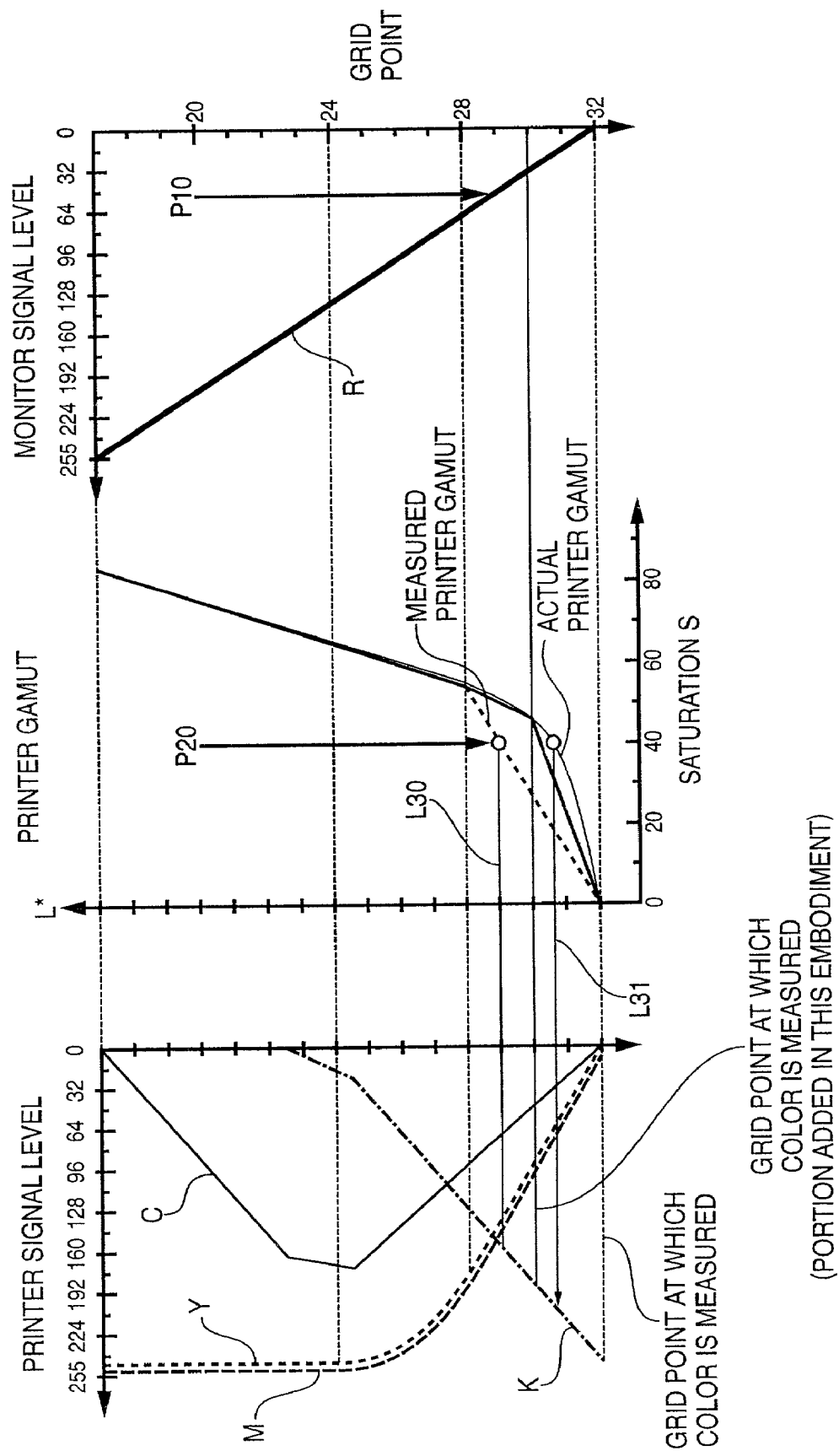
FIG. 8 is a diagram in which an area where lightness L* is lower than maximum saturation is extracted from FIG. 7 and shown in enlarged form.

FIG. 8 is a diagram in which an area where lightness L* is lower than maximum saturation is extracted from FIG. 7 and shown in enlarged form. The symbols shown in FIG. 8 correspond to those of FIG. 7. In order to describe the effects of this embodiment more clearly, the conventional sampling points are illustrated taking as an example a 5×5×5 grid of step width "64". This illustrates an example in which the colorimetry points added on in this embodiment are halved to "32" (namely a 9×9×9 grid).

Generation of the pre-color-processing table will be considered again.

RGB values for obtaining CMYKcm values correspond to P10 in FIG. 8. Further, in a gamut mapping for mapping monitor RGB values to colors (L*a*b* values) in the printer gamut, it is assumed that mapping has been carried out so as to maintain saturation before and after mapping. In such case, the position on the printer gamut corresponding to P10 is P20. However, regardless of the fact that P20 is situated on L31 in the actual printer gamut, when the conventional sampling points indicated by the broken line in FIG. 8 are measured by colorimetry and the printer gamut is formed by tetrahedral interpolation, the position shifts to L30. Accordingly, with the method of measuring color patches that are equidistant, the place where printing should be performed by the CMYKcm combination (the left side in FIG. 8) on L31 shifts to an ink changeover portion (the left side in FIG. 8) on L30. In a system in which inks of complimentary colors, black and color components change over, as in a dark portion reproduced by an ink-jet printer having at least the four colors CMYK, tonality declines owing to this change in the ink changeover area.

In accordance with the sampling method of this embodiment, on the other hand, P20 is decided as a position near L31, and therefore a more accurate ink changeover position can be acquired.

Though the description rendered above relates to a six-color ink-jet printer, it goes without saying that the technique according to this embodiment will be effective in other systems, such as that of a CMYK printer, in which changeover of a signal value is essential.

Modifications

Figure 9:
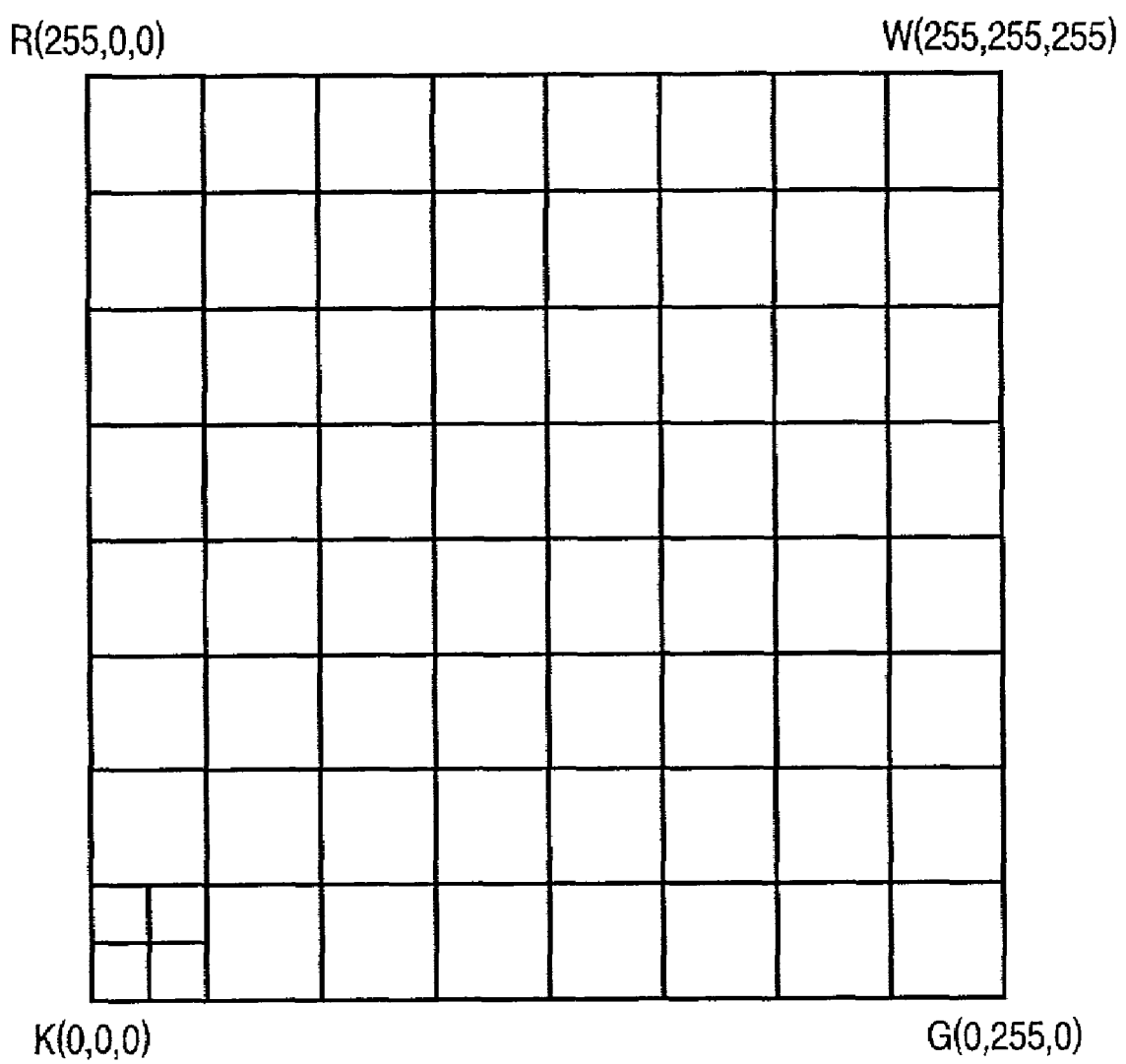
FIGS. 9 to 11 are diagrams useful in describing modifications.

In the above embodiment, an example is described in which colorimetric points are allotted to R=16 or G=16 or B=16 in order to assure tonality in dark portions and tones in the vicinity of maximum saturation (e.g., R=255, G=16, B=16). However, if consideration is given only to tone in dark portions, then it will suffice to add on colorimetric points only with regard to R=16 and G=16 and B=16, as exemplified in FIG. 9. This is effective in that the number of colorimetric points can be reduced further.

Figure 10:
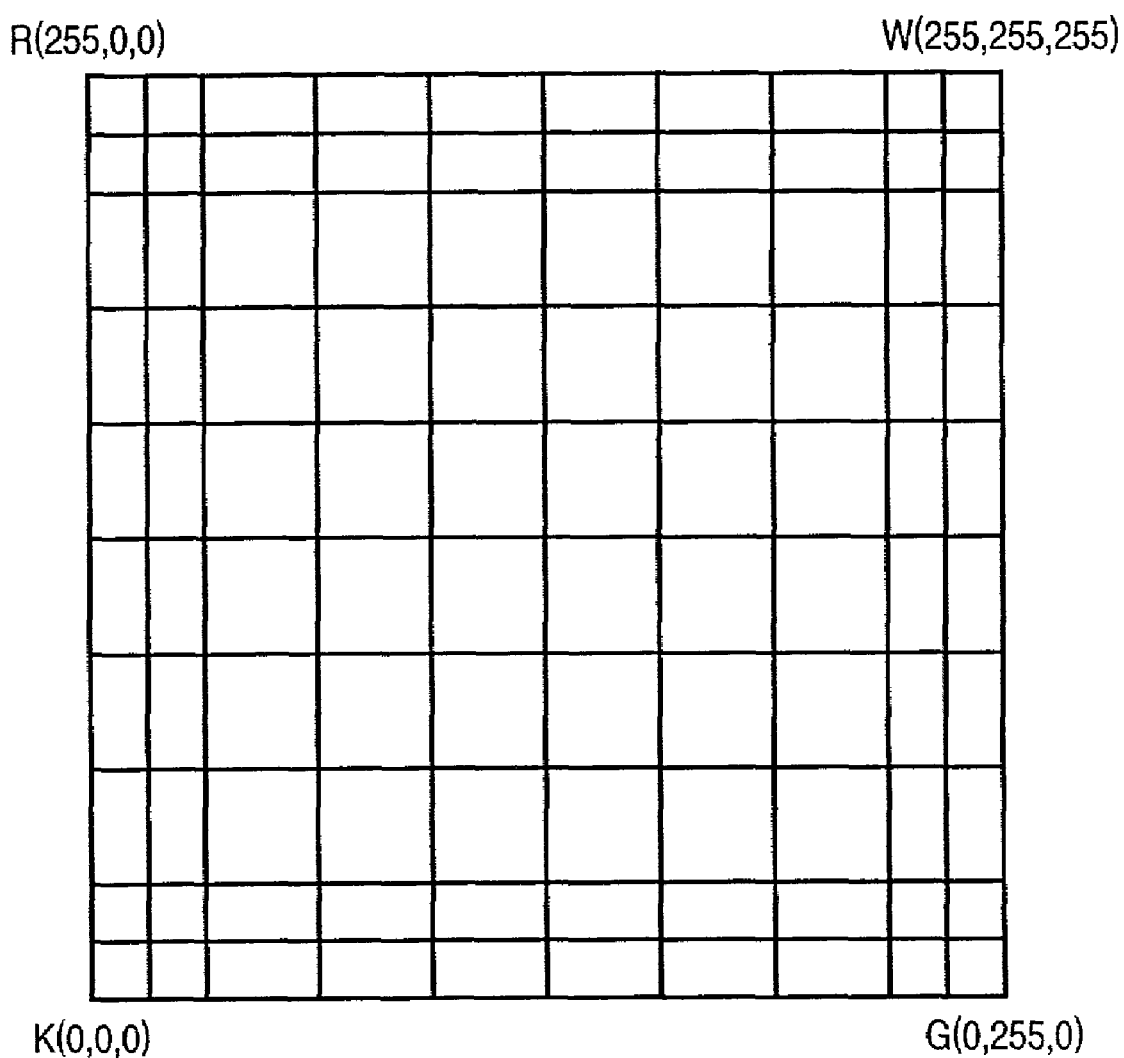

With reference again to FIG. 6, a disparity develops between the actual gamut shape and the gamut shape based upon tetrahedral interpolation in the vicinity (e.g., R=255, G=0, B=0) of maximum saturation. In such case a high tonality can be achieved even with regard to an area of high lightness by allotting colorimetric points also in the vicinity of the maximum signal level, as exemplified in FIG. 10.

Figure 11:
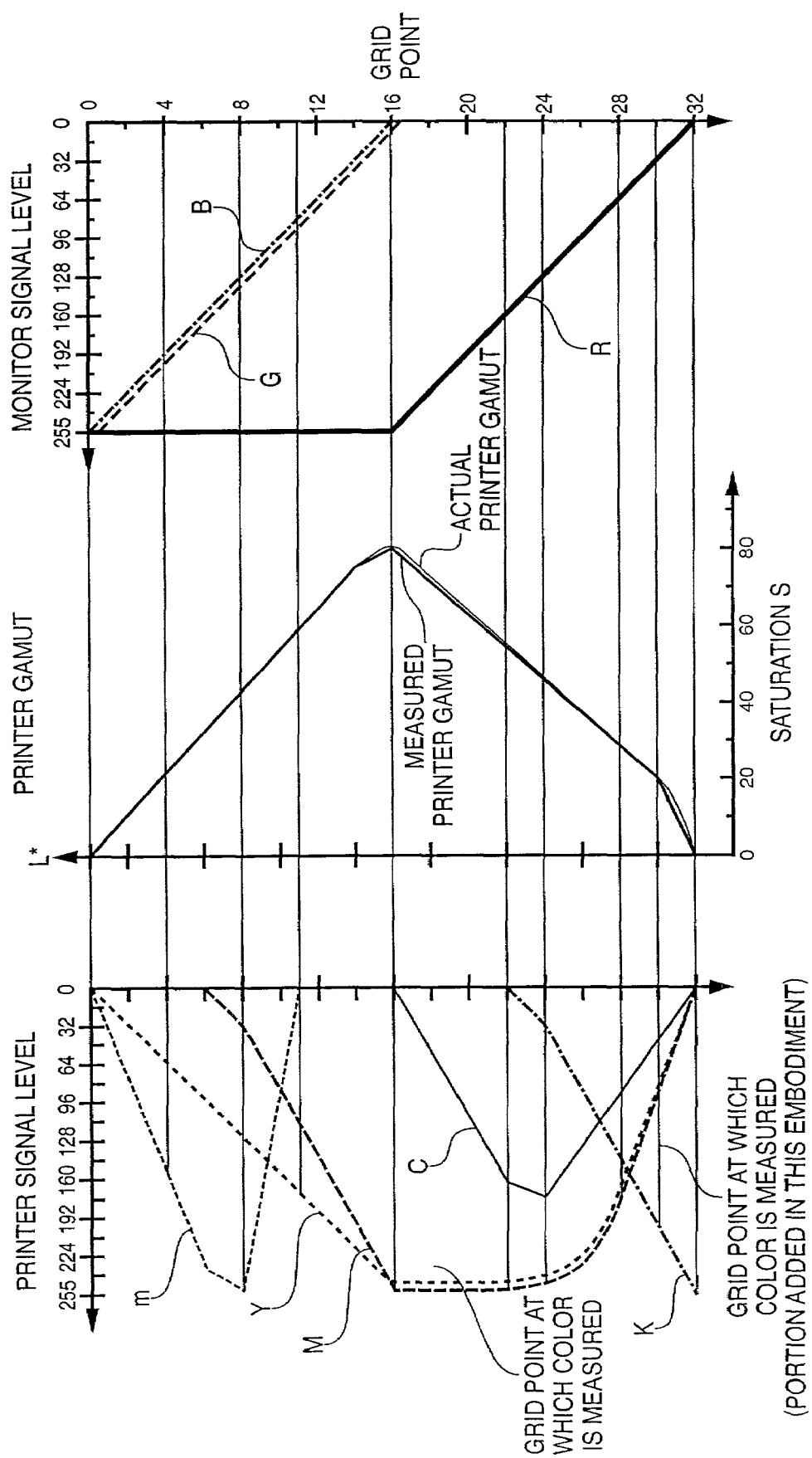

Further, as shown in FIG. 11, generally an area of high lightness is such that often the change in L*a*b* values and changeover of the ink signal value are not sudden. In such case it will suffice to allot the colorimetric points giving emphasis to portions where there is a likelihood that the change in L*a*b* values will be sudden, i.e., portions where there are many changeovers in the CMYKcm signal values. However, when the colorimetric points are decided, it is necessary to take the precaution set forth below into consideration in a case where colorimetric points are decided by a combination of one-dimensional non-uniform tables with regard to each of R, G, B, e.g., by the following combination:

R[ ]={0, 16, 32, 64, 96, 128, 160, 224, 255}

G[ ]={0, 16, 32, 64, 96, 128, 160, 224, 255}

B[ ]={0, 16, 32, 64, 96, 128, 160, 224, 255}

Specifically, even if only the six axes of white→color→black are considered in the RGB color space of the printer, the R signal will vary along these axes in order to decide R-signal grid points that are the object of colorimetry. It must be so arranged that colorimetry is performed with regard to a grid point that is the logical OR of grid points to undergo colorimetry on the six axes of MRY (dark portion) and GCB (bright portion). Similarly, in order to decide G-signal grid points that are the object of colorimetry, it must be so arranged that colorimetry is performed with regard to a grid point that is the logical OR of grid points to undergo colorimetry on the six axes of YGC (dark portion) and RBM (bright portion), and in order to decide B-signal grid points that are the object of colorimetry, it must be so arranged that colorimetry is performed with regard to a grid point that is the logical OR of grid points to undergo colorimetry on the six axes of CBM (dark portion) and RYG (bright portion).

In the foregoing embodiment, an example in which colorimetric points to be added on are decided in advance is described. However, an arrangement may be adopted in which these are calculated automatically in accordance with the following conditions:

Condition 1: Black (darkest point), white (a white point or brightest point) and maximum saturation point (R=255 or G=255 or B=255) are adopted as the points for colorimetric measurement.

Condition 2: A grid point indicating the start of ink introduction is adopted as a point that is a candidate for colorimetric measurement. For example, with regard to the White→Red→Black axis, a grid point at which C=0 holds indicates start of introduction of a complementary-color ink.

Condition 3: A grid point in a case where combinations of two or more signal values attain the same level in combinations of ink signals of composite-color components (composite-color toned inks) or toned inks and, moreover, the signs of the respective slopes thereof are different [e.g., if magenta→black is considered, the slope of cyan (C) is positive, the slope of black (K) is negative and C=K holds] is an ink changeover portion. This grid point is a candidate for undergoing colorimetric measurement.

Condition 4: In an area where lightness is greater than the maximum saturation point (a range indicated by the following expression if judged by the RGB signals), a region that is not applicable to both conditions 1 and 2 is excluded from points that are candidates for undergoing colorimetric measurement:

$$[\max\{R,\max(G,B)\}-\min\{R,\min(G,B)\}]/2+\min\{R,\min(G,B)\}>128-$$

$$[\max\{R,\max(G,B)\}-\min\{R,\min(G,B)\}]/2+\min\{R,\min(G,B)\}>128$$

It should be noted that at least one of the above conditions or two or more of the above conditions in combination may be used as appropriate.

[Method of Changing Measurement Grid Point]

A method of adaptive changing a measurement grid point in accordance with the above-mentioned post-color-processing table (ink changeover points of the post-color-processing table) will now be described. It should be noted that measured grid point can be set for each of the RGB signals. A method of selecting a measurement grid point will be described with regard to the R signal.

First, since the points R=0 and R=255 always undergo measurement, on the basis of condition 1 set forth above, a measurement grid point is selected in the range 0<R<255. However, if focus is directed toward a change in the R signal on the six axes of RYGCBM in RGB color space, the R signal will take on a value of 0<R<255 only in the intervals indicated by the arrows in FIG. 12. Of course, the G and B signals also take on values of 0<G<255, 0<B<255 in intervals indicated by the arrows. Accordingly, the axes for detecting candidates for measurement of the R signal are the six axes RK, YK, WG, WC, WB and MK among the 12 axes.

FIG. 13 is a diagram useful in describing a method of selecting grid points, when grid points to undergo measurement are selected, on grid points of an R signal. Signal changeover on axes for detecting candidates to undergo measurement are illustrated side by side. In other words, FIG. 13 illustrates how signal values of CMYKcm along each axis change in accordance with the grid number.

When grid points to undergo measurement are selected along each axis on the basis of conditions 1 to 3 set forth above, we obtain the following:

Condition 1 (white or black point): White-point area and black-point area shown in FIG. Condition 2 (start of ink introduction): Ink-introduction start point indicated by borders in FIG. 13

Condition 3 (ink changeover): Ink-changeover point indicated by white characters in FIG.

Condition 4 (bright portions): WG, WC and WB become the focus of interest, though these are not shown in FIG. 13

On each axis, those of the grid points of the R-signal values that are common are used. Accordingly, a grid point that undergoes measurement is that obtained by taking the logical OR of positions of the grid points of measurement on each of the axes. A grid point indicated by a "1" at "MEASUREMENT GRID POINTS OF R-SIGNAL VALUE" in FIG. 13 is a point to undergo measurement.

Figure 14:
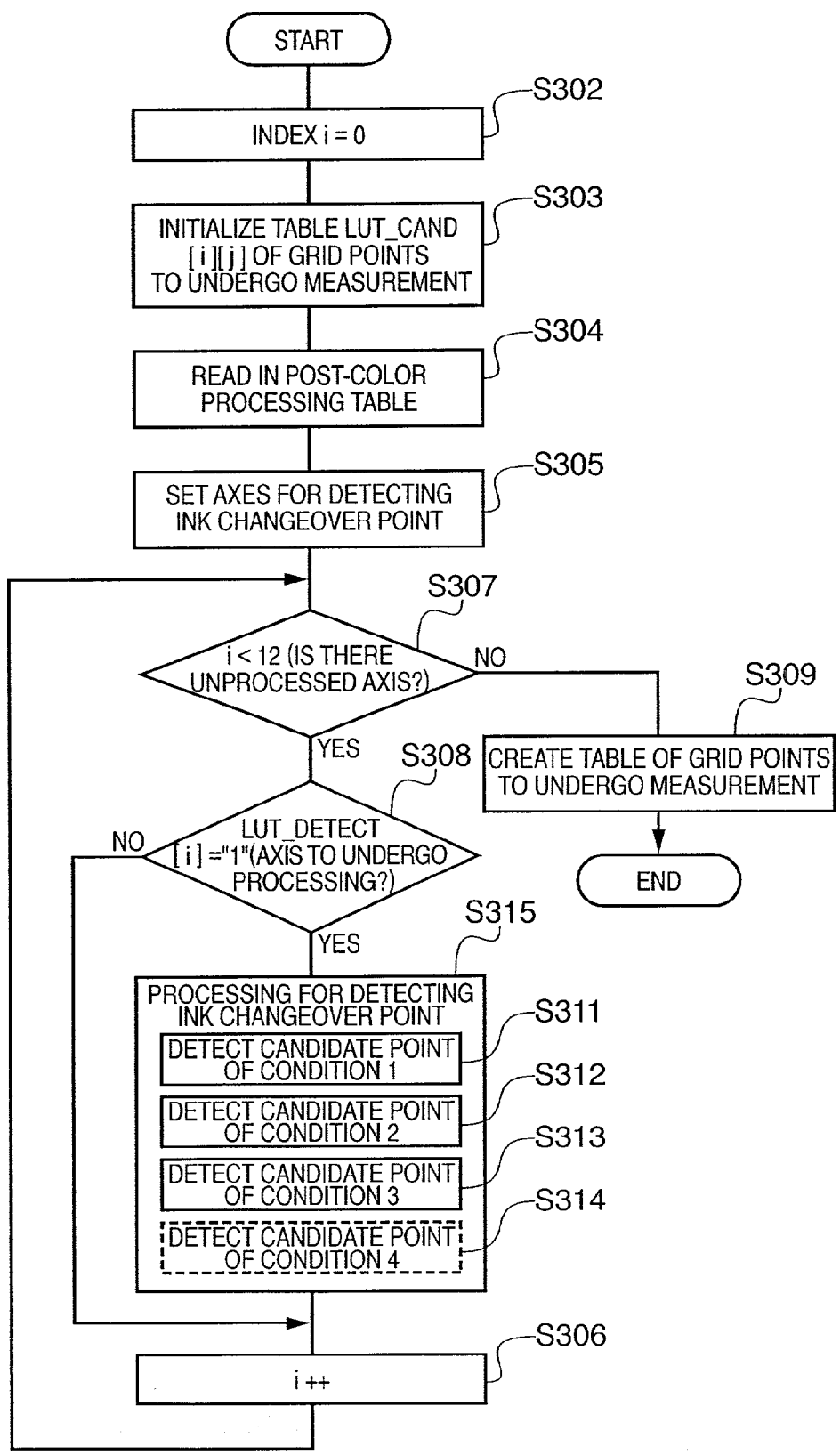
FIG. 14 is a flowchart illustrating processing for selecting grid points, which are to undergo measurement, on grid points of an R signal.

FIG. 14 is a flowchart illustrating processing for selecting grid points, which are to undergo measurement, on grid points of an R signal.

First, the index i of the axis to undergo processing is initialized to zero (S302) and a two-dimensional array LUT_CAND [12][17], which is a table of grid points to undergo measurement, is initialized to "0" (S303). It should be noted that i in a two-dimensional array LUT_CAND [i][j] corresponds to the index of the axis to undergo processing and j corresponds to the grid-point number (see FIG. 13). The index i of the axis to undergo processing represents the axis shown in FIG. 15 in the case of the R signal, by way of example.

The post-color-processing table (ink-color analysis table) is read in for the purpose of detecting ink changeover point (S304), and the axes of interest for detecting the ink changeover point are set to a one-dimensional array LUT_DETECT [i] (S305). Since the axes of interest for detecting the ink changeover point of the R signal are the axes to undergo processing shown in FIG. 15, the one-dimensional array LUT_DETECT [i] is written as follows:

R→K axis: LUT_DETECT [1]="1"
Y→K axis: LUT_DETECT [3]="1"
W→G axis: LUT_DETECT [4]="1"
W→C axis: LUT_DETECT [6]="1"
W→B axis: LUT_DETECT [8]="1"
M→K axis: LUT_DETECT [11]="1"
Other axes: LUT_DETECT [i]="0"

Next, whether index i<12 holds is discriminated to determine whether an unprocessed axis still exists (S307). If i<12 holds, whether LUT_DETECT [i]="1" holds is discriminated to determine whether the axis is an axis to undergo processing (S308). If LUT_DETECT [i]="1" holds, then processing for detecting the ink changeover point is executed at step S315, after which the index i is incremented (S306) and control is returned to step S307. Further, in a case where LUT_DETECT [i]="0" holds (i.e., in case of an axis that does not undergo processing), the above-described detection processing is not executed, the index i is incremented (S306) and control is returned to step S307.

At step S315, grid points to undergo measurement are detected based upon conditions 1 to 3 at S311 to S313. However, detection (S314) of a measurement grid point according to condition 4 may be added on, as shown in FIG. 14. In a case where grid point j to undergo measurement has been detected, LUT_DETECT [i][j] is made "1".

When the index i is thus incremented to change the axis to undergo processing and detection of grid points to undergo measurement is completed with regard to all axes, the results of detection for each axis are combined at step S309 to create a table LUT_CAND_MERGE [i][j] of grid points to be measured. More specifically, with regard to the R signal, the table LUT_CAND_MERGE [i][j] of grid points to be measured in which a grid point to undergo measurement is represented by "1" and a grid point that is not to undergo measurement is represented by "0" is obtained by performing the calculation of Equation (1).

$$\text{LUT\_CAND\_MERGE}[j] = \cap \text{LUT\_CAND}[i][j] \quad (1)$$

where the ø calculation is from i=0 to i=12.

If the above-described procedure is applied to the B and G signals, then grid points to undergo measurement can be decided in RGB color space.

In the example described above, detection of ink changeover point is carried out using conditions 1 to 3 (and an additional condition 4 if desired). However, a point where a change in the ink signal value is large may be adopted as point to be measured, as by checking a differential value relating to an ink signal value. Further, the setting of grid points also is not limited to those which can be set separately for each of the RGB signals. If the above-described embodiment is modified, the method described above can be applied also to the setting of these other grid points.

Thus, color patches of a prescribed number are printed by a printer, a model equation representing the input/output characteristics of the printer is decided based upon the colorimetric values of these patches, and other colorimetric values can be estimated by this model equation. As a result, even if the number of color patches actually printed is not large, colorimetric values can be estimated with a comparatively high precision. In other words, highly precise colorimetric values can be estimated with a small number of color patches. In addition, color-correction data can be created utilizing these values.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for generating a color reproduction model of a device to be utilized in an estimate of a colorimetric value corresponding to any color patch, by using a plurality of colorimetric values, comprising the steps of:

examining grid points and signals of the grid points for color materials in a color separation table which is used by the device to separate an image signal into the signals for the color materials;

deciding grid points which correspond to a dark point, a brightest point, a maximum saturation point, and a changeover area of the color materials and are non-equidistantly in a color signal space of the device, based on an examination result in the examining step; and measuring the plurality of colorimetric values from color patches corresponding to the grid points decided in the deciding step, wherein said examining, deciding and measuring steps are implemented at least partially by using a computer.

2. The method according to claim 1, wherein the color materials are inks, and the changeover area is that the signal values for the inks of two or more complementary-color components are the same, and respective slopes of characteristics indicating those signals are inverse.

3. A computer-readable medium encoding a computer program comprising computer program code for causing a computer to perform an image processing method for generating a color reproduction model of a device to be utilized in an estimate of a colorimetric value corresponding to any color patch, by using a plurality of colorimetric values, the method comprising the steps of:

examining grid points and signals of the grid points for color materials in a color separation table which is used by the device to separate an image signal into the signals for the color materials;

deciding grid points which correspond to a dark point, a brightest point, a maximum saturation point, and a changeover area of the color materials and are non-equidistantly in a color signal space of the device, based on an examination result in the examining step; and measuring the plurality of colorimetric values from color patches corresponding to the grid points decided in the deciding step.

4. An image processing apparatus for generating a color reproduction model of a device to be utilized in an estimate of a colorimetric value corresponding to any color patch, by using a plurality of colorimetric values, comprising:

an examining unit, arranged to examine grid points and signals of the grid points for color materials in a color separation table which is used by the device to separate an image signal into the signals for the color materials;

a deciding unit, arranged to decide grid points which correspond to a dark point, a brightest point, a maximum saturation point, and changeover area of the color materials and are non-equidistantly in a color signal space of the device, based on an examination result of said examining unit; and a generator, arranged to generate color patches corresponding to the grid points decided by said deciding unit; and a measuring unit, arranged to measure the plurality of colorimetric values from the color patches generated by said generator.

5. The computer-readable medium according to claim 3, wherein the color materials are inks, and the changeover area is that the signal values for the inks of two or more complementary-color components are the same, and respective slopes of characteristics indicating those signals are inverse.

6. The apparatus according to claim 4, wherein the color materials are inks, and the changeover area is that the signal values for the inks of two or more complementary-color components are the same, and respective slopes of characteristics indicating those signals are inverse.

* * * * *